United States Patent
Mackenzie et al.

(10) Patent No.: US 10,645,632 B2
(45) Date of Patent: May 5, 2020

(54) PHYSICAL CELL ID ALLOCATION (71) Applicant: BRITISH TELECOMMUNICATIONS PUBLIC LIMITED COMPANY, London (GB)

(72) Inventors: Richard Mackenzie, London (GB); Michael Fitch, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 15/118,967

(22) PCT Filed: Feb. 19, 2015

(86) PCT No.: PCT/GB2015/050476
§ 371 (c)(1),
(2) Date: Aug. 15, 2016

(87) PCT Pub. No.: WO2015/128615
PCT Pub. Date: Sep. 3, 2015

(65) Prior Publication Data
US 2017/0048784 A1 Feb. 16, 2017

(30) Foreign Application Priority Data
Feb. 25, 2014 (EP) .................................... 14250028

(51) Int. Cl.
*H04W 40/32* (2009.01)
*H04W 8/26* (2009.01)
(Continued)

(52) U.S. Cl.
CPC .......... *H04W 40/32* (2013.01); *H04B 17/318* (2015.01); *H04W 8/26* (2013.01); *H04W 16/32* (2013.01); *H04W 36/0061* (2013.01)

(58) Field of Classification Search
CPC ....... H04W 40/32; H04W 8/26; H04W 16/32; H04W 36/0061; H04B 17/318
(Continued)

(56) References Cited

U.S. PATENT DOCUMENTS 8,391,158 B2   3/2013   Gupta et al.
8,504,072 B2 * 8/2013   Ishii ...................... H04W 88/02
                                                    455/456.2
(Continued)

FOREIGN PATENT DOCUMENTS

WO   WO 2013/078573   6/2013

OTHER PUBLICATIONS

International Search Report for PCT/GB2015/050476 dated May 29, 2015, 3 pages.
(Continued)

Primary Examiner — Mong-Thuy T Tran
(74) Attorney, Agent, or Firm — Nixon & Vanderhye PC (57) ABSTRACT

A method and device are provided for allocating a Physical Cell ID, PCI, to a cell, the 5 cell being one of a plurality of cells (e.g. femtocells) within a coverage area of a larger cell's (e.g. macrocell) base station, comprising defining a plurality of bands for the larger cell based on signal strength data from the plurality of cells within the coverage area, wherein each band has a predetermined signal strength range, and allocating a PCI to a cell based on a strength of signal from the larger cell's base station and its 10 corresponding band of the plurality of bands.

14 Claims, 6 Drawing Sheets

(51) Int. Cl.
*H04B 17/318* (2015.01)
*H04W 16/32* (2009.01)
*H04W 36/00* (2009.01)

(58) Field of Classification Search
USPC .......................................................... 455/449
See application file for complete search history.

(56) References Cited

U.S. PATENT DOCUMENTS

| | | | | |
|---|---|---|---|---|
| 9,253,705 | B1* | 2/2016 | Pawar | H04W 36/32 |
| 2010/0020710 | A1 | 1/2010 | Gupta et al. | |
| 2010/0331025 | A1 | 12/2010 | Kallin et al. | |
| 2011/0059744 | A1 | 3/2011 | Won et al. | |
| 2011/0076960 | A1* | 3/2011 | Yun | H04W 24/10 |
| | | | | 455/67.14 |
| 2011/0086652 | A1 | 4/2011 | So et al. | |
| 2011/0190000 | A1 | 8/2011 | Kwun | |
| 2011/0261777 | A1* | 10/2011 | Maeda | H04W 48/20 |
| | | | | 370/329 |
| 2012/0015681 | A1* | 1/2012 | Dalsgaard | H04W 48/08 |
| | | | | 455/517 |
| 2012/0071169 | A1 | 3/2012 | Olofsson et al. | |
| 2013/0079048 | A1* | 3/2013 | Cai | H04W 48/16 |
| | | | | 455/517 |
| 2013/0143541 | A1* | 6/2013 | Henderson | H04W 16/24 |
| | | | | 455/418 |
| 2013/0150057 | A1* | 6/2013 | Cho | H04W 8/26 |
| | | | | 455/449 |
| 2014/0004860 | A1 | 1/2014 | Maida et al. | |
| 2014/0086173 | A1* | 3/2014 | Sadeghi | H04L 5/005 |
| | | | | 370/329 |
| 2014/0112243 | A1* | 4/2014 | Suzuki | H04W 56/00 |
| | | | | 370/328 |
| 2014/0369285 | A1* | 12/2014 | Li | H04W 24/02 |
| | | | | 370/329 |
| 2015/0038140 | A1* | 2/2015 | Kilpatrick, II | H04W 64/00 |
| | | | | 455/436 |
| 2015/0319624 | A1* | 11/2015 | Garcia | H04W 8/26 |
| | | | | 370/329 |
| 2016/0088589 | A1* | 3/2016 | Park | H04W 24/02 |
| | | | | 455/452.1 |
| 2016/0286456 | A1* | 9/2016 | Zingler | H04W 36/0083 |
| 2016/0345168 | A1* | 11/2016 | Zhou | H04W 16/10 |

OTHER PUBLICATIONS

Written Opinion of the ISA for PCT/GB2015/050476 dated May 29, 2015, 7 pages.
Wikipedia entry on Hamming Distance, retrieved on Jan. 22, 2014, (4 pages) https://en.wikipedia.org/w/index.php?title=Hamming_distance&oldid=587411386.
Kawajiri et al., LTE Cell Planning Support Tool (CELPLA L), Technology Reports, NTT DOCOMO Technical Journal vol. 13, No. 4, 2012, (pp. 63-70).
Premnath et al., "Self-Configuration of Basic LTE Radio Parameters using Magnetic Field Model", 978-1-4673-0762-8/12, 2012, IEEE (pp. 36-40).
Amirijoo, et al., "Neighbor Cell Relation List and Physical Cell Identity Self-Organization in LTE", Wireless Access Networks, Ericcson Research, Ericcson AB Sweden, date not known, (5 pages).
Krichen, "Performances Evaluation of Different Algorithms for PCIs Self Configuration in LTE", University of Versailes, France, 978-1-4673-4523/1/12—IEEE, 2012, (8 pages).
Ahmed, et al., "Geo-Location Based Self Organization Scheme for Femtocell Networks", INMC, School of EECS, Seoul National University, Seoul, Korea, 2012 (5 pages).
Saxena et al., "Auto-Configuration of Physical Cell ID in LTE Femtocellular Systems using Self Organizing Networks", Wireless Netw, DOI-10.1007/s11276-013-0636-3, Science and Business 2013 (14 pages).
Search Report dated Feb. 2, 2019 issued in Chinese Application No. 201580010347.7 (2 pgs.).

* cited by examiner

PHYSICAL CELL ID ALLOCATION

This application is the U.S. national phase of International Application No. PCT/GB2015/050476 filed 19 Feb. 2015 which designated the U.S. and claims priority to EP Application No. 14250028.9 filed 25 Feb. 2014, the entire contents of each of which are hereby incorporated by reference.

FIELD OF THE INVENTION

The present invention relates to Physical Cell ID, PCI, allocation in mobile telecommunication networks.

BACKGROUND TO THE INVENTION 4G networks are the fourth generation of mobile telecommunication technology standards, and include the WiMAX and LTE-Advanced network standards. The 4G networks include a new architecture to support a small scale evolved Node B (eNodeB), which may be installed in private homes (known as a femto access point, or femtocell), or outdoor areas (known as metrocells or picocells, depending on the coverage area). These cells are collectively known as small cells.

Small cells can reside in a coverage area of a larger macro cell, and must each include a Physical Cell ID, PCI, to identify itself to other cells and User Equipment, UE, on the mobile network. In 4G networks, cells can self-allocate their PCI by selecting from a pool of 504 possible PCIs, the selection process depending on the addresses used by neighbouring cells (which differs from the centralized PCI allocation procedure of previous mobile telecommunications networks). For example, an eNodeB for a new cell initially selects a random PCI from the possible PCIs, and determines the PCIs in use by neighbouring cells after receiving a measurement report from a User Equipment, UE, or by sniffing neighbouring cells. The eNodeB may then alter its PCI such that there are no collisions or confusion with any neighbouring cells. The skilled person will understand that a PCI collision occurs when two neighbouring cells have an identical PCI, and PCI confusion occurs when a UE can detect two cells with identical PCIs. A violation of either of these rules is known as a PCI conflict.

The PCI value is very important during the cell selection, handover and reselection processes. When a UE is switched on and does not have an up to date list of neighbouring cells, the UE will scan for eNodeBs belonging to its network using the Public Land Mobile Networks stored in its Universal Subscriber Identity Module. The UE will decode primary and secondary synchronization signals from eNodeBs in the Public Land Mobile Network (and calculate the PCIs for the eNodeBs from these synchronization signals), and measure their signal strength. The UE will then attempt to register with an eNodeB for its highest priority Public Land Mobile Network.

As the UE moves between cells, a cell handover process is used to transfer the UE from a serving cell to a destination cell. In dense cell deployment areas (which is common for small cells), the handover is problematic if there is a PCI conflict. For example, if the serving cell has two neighbouring cells with identical PCIs (i.e. such that there is PCI confusion), then the handover may not take place. To overcome this, an additional identifier for the destination cell (a Global Cell Identifier) is sent to the serving cell, which enables differentiation of the two neighbouring cells with identical PCIs.

When a UE is camped on a cell, it may enter an Idle mode (if, for example, there is no traffic flowing to it) and periodically initialize to check the signal strength of the eNodeB. If the signal strength drops below a threshold value, the UE will perform a cell reselection process to select the most appropriate cell (e.g. a cell having a greater signal strength). The cell reselection process can be aided by a neighbour list that is broadcast by the serving cell. The neighbour list can contain the PCIs for up to 16 neighbouring cells, along with a Q offset value for each PCI. The Q offset is an offset between −24 dB and +24 dB, which the UE adds to a measured signal strength for that cell (along with configured hysteresis values). The UE may then determine which cell to select by: identifying a plurality of neighbouring cells (using the PSS and SSS signals), measuring the signal strength from each cell, add the Q offset to the measured signal strength for each cell of the plurality of neighbouring cells that is also present on the neighbour list, and select a cell to connect to based on the signal strength including the Q offset. The Q offset value is therefore used to make neighbouring cells more or less attractive, for example, if a cell has a high level of traffic and a neighbouring cell has a low level of traffic, it may give the neighbouring cell a positive Q offset in the neighbour list to encourage the UE to connect to that cell instead.

The present inventors have identified a problem with the cell reselection process when there is a PCI conflict. That is, the neighbour list broadcast by each eNodeB only includes the PCI value to identify a cell, such that it cannot differentiate between two cells having the same PCI. In the event the neighbour list includes a PCI conflict, the neighbor list will not be able to list the two different Q offsets for the same PCI.

This problem is particularly relevant for small cells, as it is likely that many small cells will be deployed in a small geographical area (for example, a block of flats in which each flat has its own small cell). In such circumstances, there may be more than 504 small cells deployed within a macrocell coverage area, giving a high probability that PCI duplication occurs. Furthermore, as the neighbour list may only include a maximum of 16 cells, there is also a high probability that PCI duplication occurs on this list.

International Patent Application Number 2013/078573 A1 discloses a method and apparatus for PCI allocation in a cellular network, wherein the PCI for a second cell is allocated based on a distance relation between a first cell and the second cell and radii of first and second boundary circles of the first and second cells respectively.

US Patent Application Publication Number 2011/0086652 discloses a method and apparatus for allocating PCIs in a wireless communication system by using a PCI reuse factor and the received signal strength of each of the cells using a set of candidate PCIs.

It is therefore desirable to alleviate some or all of the above problems.

SUMMARY OF THE INVENTION

According to a first aspect of the invention, there is provided a method of allocating a Physical Cell ID, PCI, to a cell, wherein the cell is one of a plurality of cells disposed within a coverage area of a second cell's base station, the method comprising the steps of: receiving signal strength data for a plurality of cells, wherein the signal strength data relates to the strength of a signal from a second cell's base station at each cell of the plurality of cells; defining a plurality of bands in a coverage area of the second cell's base station based on the received signal strength data, wherein each band has a predetermined signal strength range; and allocating a PCI to a cell of the plurality of cells based on the strength of the signal from the second cell's base station at the cell and its corresponding band of the plurality of bands.

The method of the present invention may therefore allocate a PCI to a cell as a function of the strength of a single from a second cell's base station at the cell and of the strength of a signal from the second cell's base station at each cell of a plurality of cells within the coverage area. In particular, a plurality of bands (each representing a signal strength range) may be defined based on the signal strength data, and all small cells within a band of the plurality of bands may be allocated one of a plurality of PCIs designated for that band, wherein there may be no duplication of PCIs between bands. This reduces the likelihood of a PCI conflict for the plurality of small cells.

Furthermore, the Q offset value may also be the same for all cells within any one band. Accordingly, a neighbour list may be compiled including a plurality of cells and corresponding Q offsets, which only includes unique pairs of PCI and Q offset entries.

The method may further comprise the step of sending a signal to the cell, the signal including the allocated PCI. Thus, once the PCI values for a plurality of cells within the second cell's coverage area have been allocated, it may send signals to each cell indicating its allocated PCI. The cell may then select its PCI and reconfigure its PSS and SSS signals accordingly.

The method may further comprise the step of allocating a PCI from a set of PCIs to each cell of the plurality of cells based on the strength of the signal from the second cell's base station at each cell and its corresponding band of the plurality of bands, wherein each band includes a corresponding set of PCIs. The method may be implemented by a second cell's eNodeB, a small cell or a dedicated device in the network.

According to a second aspect of the invention, there is provided a device for allocating a Physical Cell ID, PCI, to a cell, wherein the cell is one of a plurality of cells disposed within a coverage area of a second cell's base station, the device comprising a receiver for receiving signal strength data for a plurality of cells, wherein the signal strength data relates to the strength of a signal from a second cell's base station at each cell of the plurality of cells; and a processor adapted to define a plurality of bands in a coverage area of the second cell's base station based on the received signal strength data, wherein each band has a predetermined signal strength range, and is further adapted to allocate a PCI to a cell of the plurality of cells based on the strength of the signal from the second cell's base station at the cell and its corresponding band of the plurality of bands.

A computer program containing computer-executable code which, when executed on a computer, causes the computer to perform the steps of the method of the first aspect of the invention.

BRIEF DESCRIPTION OF THE FIGURES

In order that the present invention may be better understood, embodiments thereof will now be described, by way of example only, with reference to the accompanying drawings in which.

DETAILED DESCRIPTION OF EMBODIMENTS

Figure 1:
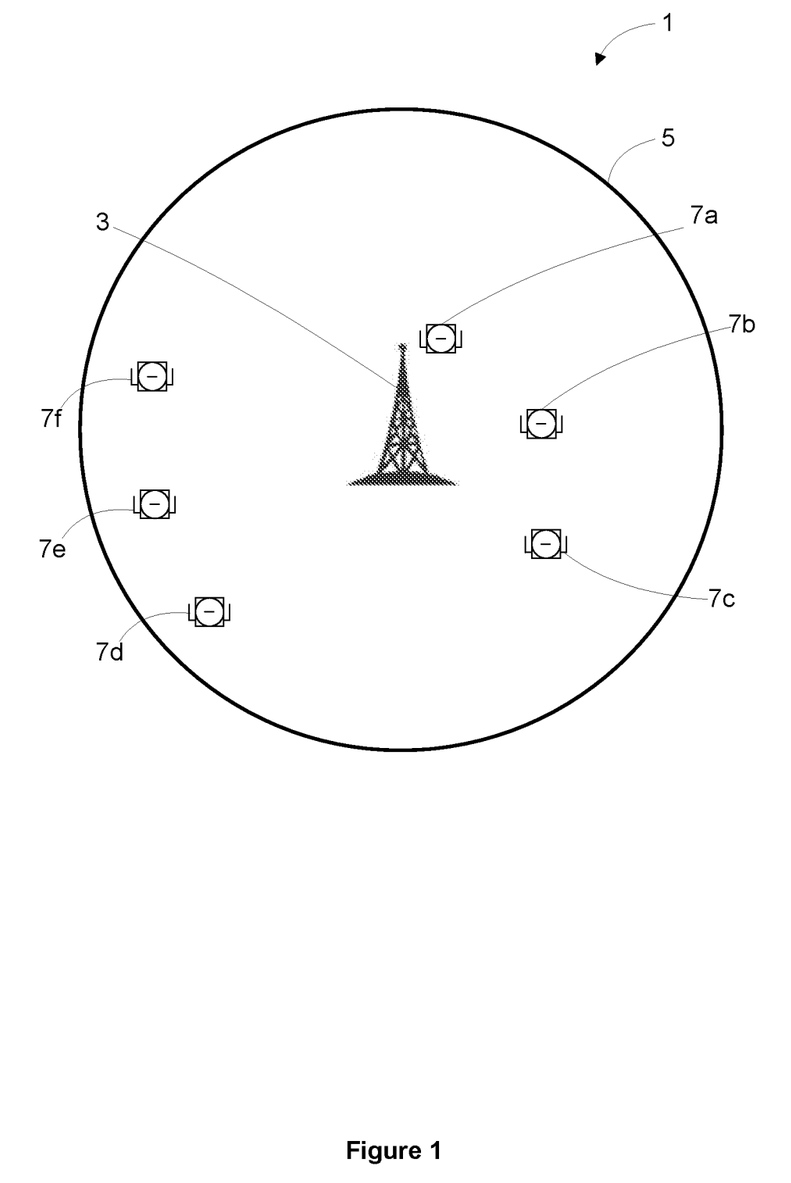
FIG. 1 is a schematic diagram illustrating a first embodiment of the present invention, including a macrocell and small cell system.

A first embodiment of a method of the present invention will now be described with reference to FIGS. 1 to 5. FIG. 1 illustrates a typical macrocell system 1. The macrocell 1 includes an eNodeB 3, configured to transmit signals about a coverage area 5. The strength of these signals varies about the coverage area 5. Generally, the signal strength attenuates with distance from the eNodeB 3, but may also attenuate due to other factors, such as buildings or geographical influences. The reduction in signal strength is commonly known as 'path loss', and an edge of the coverage area 5 may be defined by the points at which the signal strength is negligible. The skilled person will understand that the edge of the coverage area 5 will typically have a non-circular form, but a circle is used in the Figures for convenience.

Figure 2:
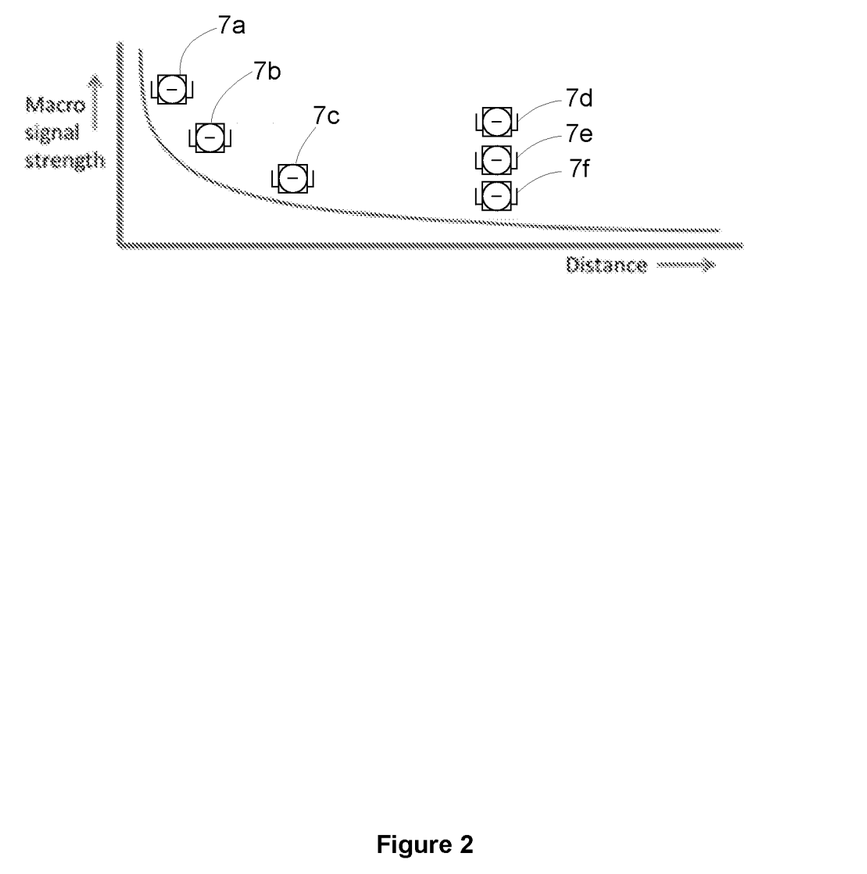
FIG. 2 is a graph illustrating the relationship between signal strength and distance for signals in the macrocell and small cell system of FIG. 1.

FIG. 1 also illustrates a plurality of femtocells 7 (femtocells 7a . . . 7f) in the coverage area 5 of the macrocell eNodeB 3. FIG. 2 is a graph illustrating the relationship between the strength of the signals from the eNodeB 3 as measured at each femtocell 7a . . . 7f against the distance for each femtocell 7a . . . 7f from the macrocell eNodeB 3. As illustrated, the signal strength typically follows an exponential relationship with distance from the macrocell eNodeB 3. Accordingly, the signal strength for femtocells closer to the macrocell eNodeB 3 varies more relative to distance than for femtocells further away from the macrocell eNodeB 3. Thus, femtocells 7d, 7e, 7f all experience approximately the same signal strength despite any differences in distance from the macrocell eNodeB 3, whilst femtocells 7a, 7b, 7c experience very different signal strengths due to differences in distance from the macrocell eNodeB 3.

Figure 3:
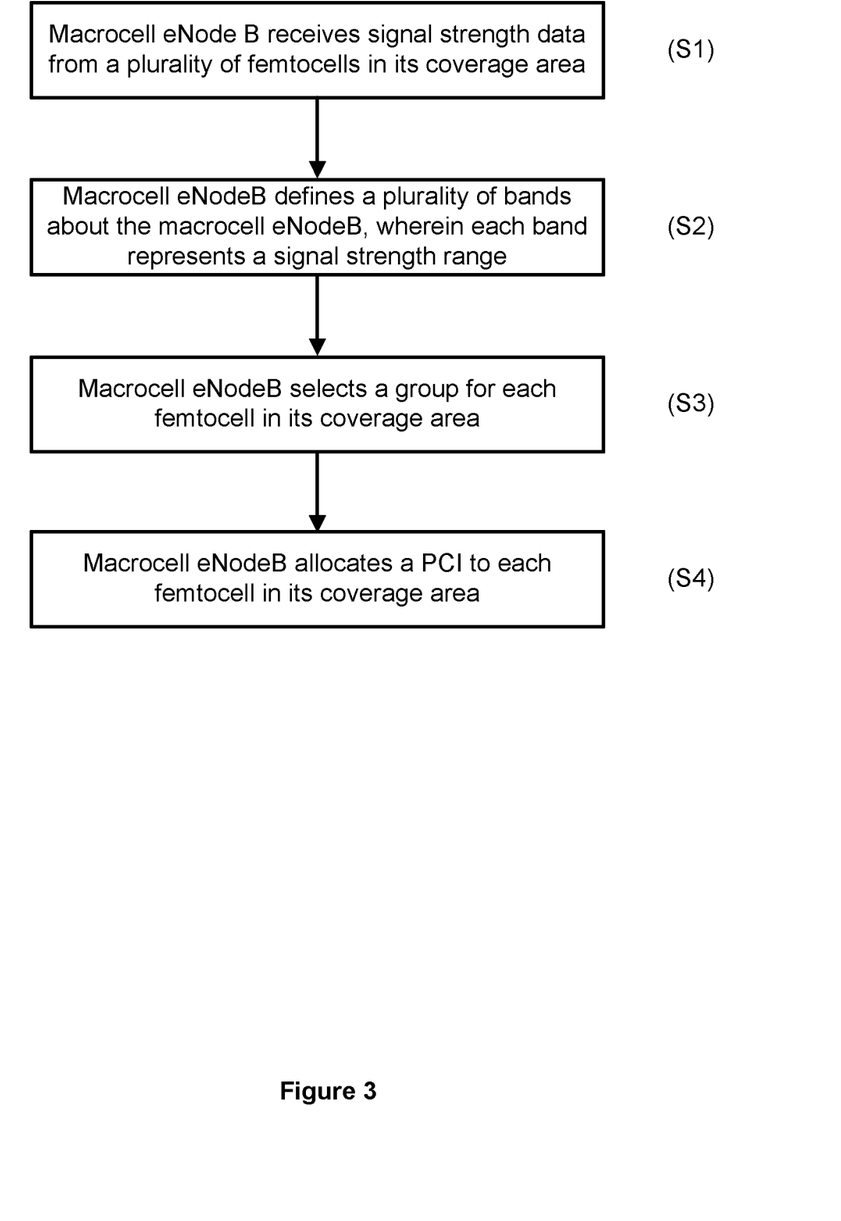
FIG. 3 is a flow diagram illustrating a method of the embodiment of FIG. 1.

FIG. 3 is a flow chart illustrating the method for allocating Physical Cell IDs, PCIs, to a femtocell in the macrocell coverage area. In this embodiment, the method is implemented by the macrocell eNodeB 3. As a first step, the macrocell eNodeB 3 receives signal strength data from a plurality of femtocells within the macrocell coverage area (step S1). Thus, each femtocell measures the strength of a signal from the macrocell eNodeB 3, and reports the measured signal strength to the macrocell eNodeB 3. The macrocell eNodeB 3 may then collate all these measurements to produce the signal strength data.

The macrocell eNodeB 3 then defines a plurality of bands about the macrocell eNodeB 3, wherein each band represents a signal strength range (step S2). Again, the limits of each band will generally have a non-circular form, but a circular representation is used in FIGS. 4 and 5 for convenience. The width of each signal strength range (measured in dB) will vary and is calculated by the macrocell eNodeB 3.

The macrocell eNodeB 3 may calculate the width of each signal strength range in a variety of ways. For example, the limits of each signal strength range may be defined such that coverage area 5 is covered with a particular number of bands of equal thickness (i.e. equal range in dB), such that each band has an equal number of femtocells.

The macrocell eNodeB 3 then selects a group for each femtocell (step S3), based on the measured signal strength for each femtocell and its corresponding band from the plurality of bands (i.e. a comparison of the measured signal strength and the signal strength range for each band).

The macrocell eNodeB 3 then allocates a PCI to each femtocell (step S4). The macrocell eNodeB 3 uses an allocation algorithm to allocate the PCIs to each femtocell, with the aim of minimizing any chances of interference between two femtocells. In this embodiment, the allocation algorithm allocates one of three possible PCIs to each femtocell in any one group, with no duplication of PCIs across different groups. The PCI values are chosen such as to maximise the Hamming distance between the femtocells in the group, thus minimizing the chances of interference between signals transmitted from the plurality of femtocells.

The skilled person will understand that it is not essential that each band includes three possible PCI allocations. This allows the algorithm to define five different bands with at least three possible PCI allocations per band (with the current maximum of 16 PCIs in a neighbour list). The present inventors have found that this is a good compromise between reducing the number of conflicts per band and providing good mobility. However, the skilled person will understand that this is not essential, and any number of PCI allocations may be implemented.

Figure 4:
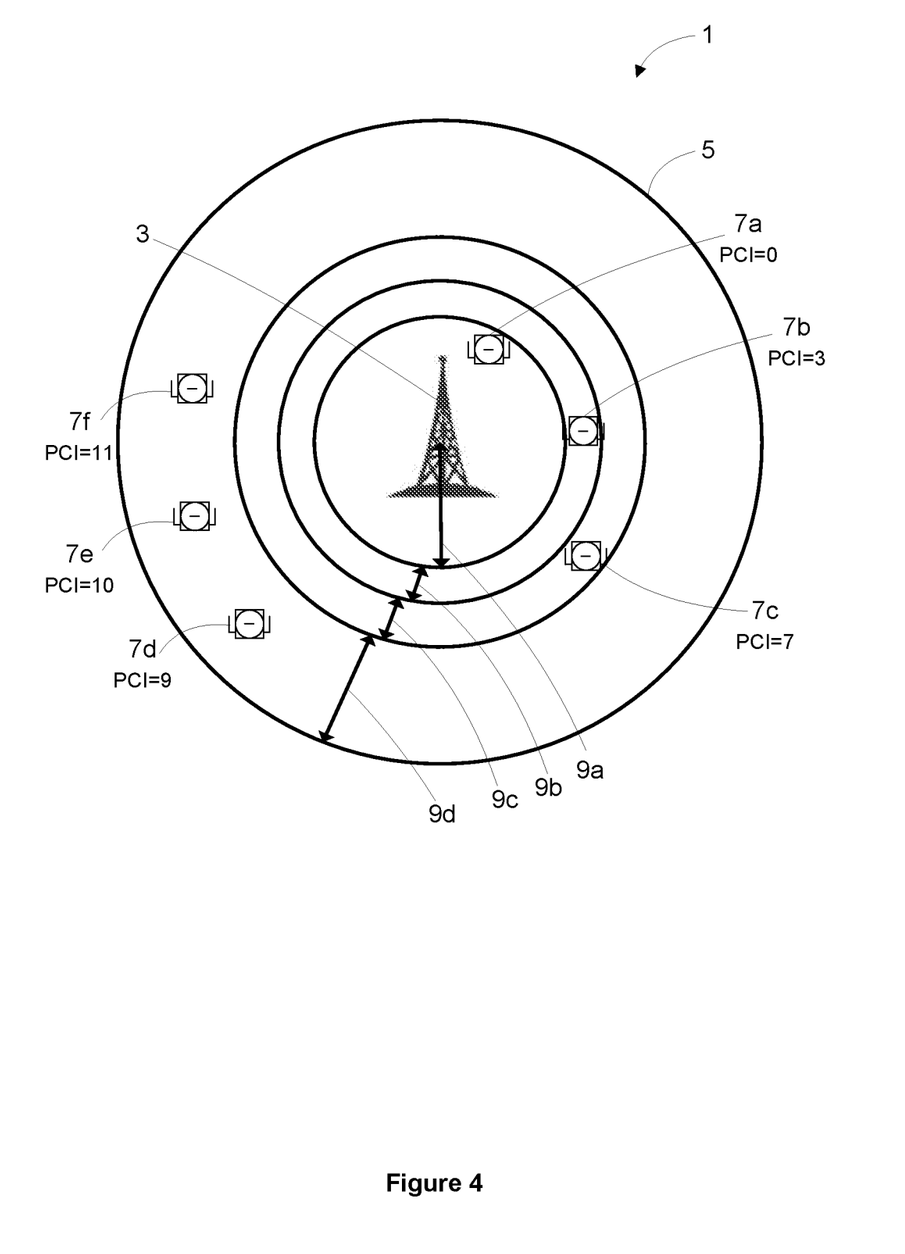
FIG. 4 is a schematic diagram for the macrocell and small cell system of FIG. 1, showing a plurality of bands.

FIG. 4 illustrates an example of the method of the present invention applied to the macrocell 1 of FIG. 1. As a first step, each femtocell 7a ... 7f reports its measured signal strength to the macrocell eNodeB 3, which is then collated to produce signal strength data for the plurality of femtocells 7.

The macrocell eNodeB 3 then defines a plurality of bands 9a, 9b, 9c, 9d about the macrocell eNodeB 3, wherein each band represents a signal strength range. In this example, a first band 9a has a strength range of 90 dB, a second band 9b has a strength range of 20 dB, a third band 9c has a strength range of 20 dB, and a fourth band has a strength range of 20 dB.

As shown in FIG. 4, a first femtocell 7a is positioned within the first band 9a (i.e. the signal strength for the first femtocell 7a is within the signal strength range of the first band 9a), the second femtocell 7b is positioned within the second band 9b (i.e. the signal strength for the second femtocell 7b is within the signal strength range of the second band 9b), a third femtocell 7c is positioned within the third band 9c (i.e. the signal strength for the third femtocell 7c is within the signal strength range of the third band 9c), and the fourth, fifth and sixth femtocells 7d, 7e, 7f are all positioned within the fourth band 9d (i.e. the signal strength for the fourth, fifth and sixth femtocells 7d, 7e, 7f are within the signal strength range of the fourth band 9d).

The macrocell eNodeB 3 then selects a group for each femtocell 7a ... 7f. In this example, the first femtocell 7a is in a first group, the second femtocell 7b is in a second group, the third femtocell 7c is in a third group, and the fourth, fifth and sixth femtocells 7d, 7e, 7f are all in the fourth group.

The macrocell eNodeB 3 then allocates a PCI to each femtocell 7a ... 7f. In this example, the macrocell eNodeB 3 allocates one of three possible PCIs to each femtocell in any one group, with no duplication across different groups. Accordingly, a femtocell in the first group may be allocated any one of PCIs 0 to 2, a femtocell in the second group may be allocated any one of PCIs 3 to 5, a femtocell in the third group may be allocated any one of PCIs 6 to 8, and a femtocell in the fourth group may be allocated any one of PCIs 9 to 11. In this embodiment, the first femtocell 7a is allocated PCI 0, the second femtocell 7b is allocated PCI 3, the third femtocell 7c is allocated PCI 7, and the fourth, fifth and sixth femtocells 7d, 7e, 7f are allocated PCIs 9, 10 and 11 respectively.

Figure 5:
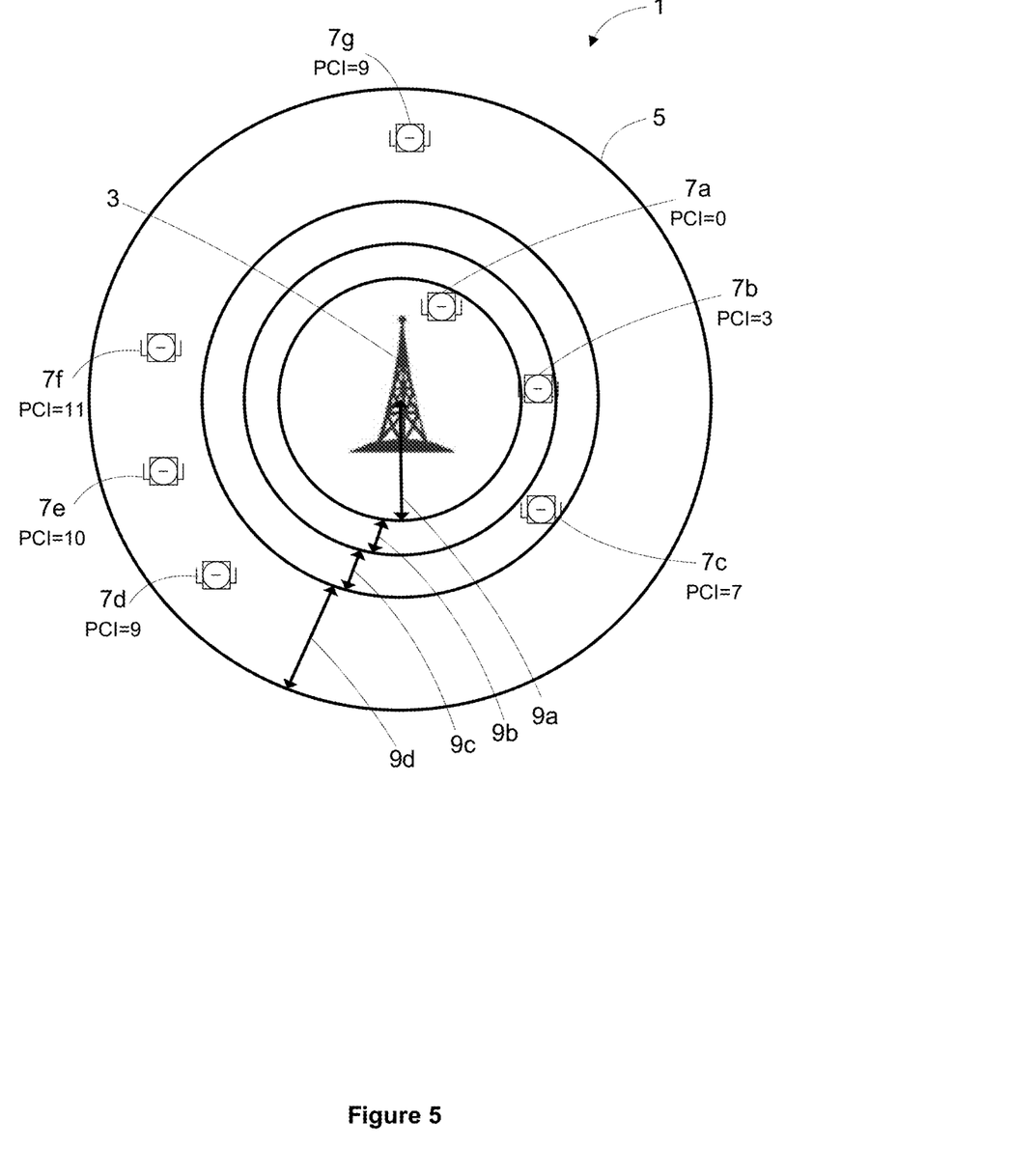
FIG. 5 is a schematic diagram for the macrocell and small cell system of FIG. 1, containing a duplicated PCI allocation.

FIG. 5 illustrates an example in which the fourth group 9d contains four femtocells 7d ... 7g. As noted above, the allocation algorithm allocates one of three possible PCIs to each femtocell in any one group, such that the allocation algorithm must allocate the same PCI to two of the four femtocells in the fourth group 9d. In this example, the allocation algorithm allocates different PCIs to femtocells in close proximity to each other (i.e. femtocells 7d, 7e, 7f are allocated PCIs 9, 10 and 11 respectively), and a duplicated PCI (PCI 9) to femtocell 7g. This method again minimizes the chances of interference between signals from the plurality of femtocells, as femtocells 7d, 7e, 7f are all allocated different PCIs and the duplicated PCI is allocated to a femtocell a much greater distance away (such that a UE will not receive any signals from two femtocells with the same PCI).

The skilled person will understand that the macrocell eNodeB 3 is able to determine which femtocells are geographically isolated within the plurality of femtocells 7. For example, the macrocell eNodeB 3 may receive data relating to the identity of nearby femtocells from each femtocell (sometimes known as "sniffing" data). This data, along with the data relating to the strength of the signal from the macrocell eNodeB 3, may be used to identify isolations of femtocells with the plurality of femtocells 7.

In this embodiment, the allocation algorithm is performed by the macrocell eNodeB 3. Once all the femtocells in the macrocell's coverage area 5 have been allocated a PCI, then macrocell eNodeB 3 may send a signal to each femtocell indicating the allocated PCI. Each femtocell may then select its PCI based on this allocated value. If a femtocell is added, the algorithm may need to be re-run.

When a User Equipment, UE, is selecting or reselecting a cell, it may use a neighbour list to determine which cell is the most appropriate cell to connect to. In this embodiment, the neighbour list is compiled and broadcast by the macrocell's eNodeB 3, and includes a plurality of neighbouring cells and their corresponding Q offset. The skilled person will understand that the Q offset is a value between −24 dB and +24 dB, which is configured to make a cell more or less attractive to a UE to connect to.

The plurality of neighbouring cells on the neighbour list may include a plurality of femtocells within the macrocell's coverage area 5, which have been allocated a PCI based on the above algorithm, together with their corresponding Q offset (which, in this embodiment, is the same value for all femtocells in a particular group). As PCIs are allocated such that there is either no duplication with nearby femtocells, or any duplicated PCIs are allocated to distant femtocells, there is a reduced chance of a conflict between cells in the plurality of neighbouring cells.

During the cell selection or reselection process, the UE may receive a neighbour list from either the macrocell eNodeB 3 (e.g. in SIB5 if the femto layer is on another frequency) or a femtocell (e.g. in SIB4). The UE may therefore differentiate between each cell in the plurality of neighbouring cells and determine which Q offset is attributed to each cell. The UE may then determine the signal strength to all nearby cells, calculate the PCI values for each cell (from the PSS and SSS synchronization signals), and apply the Q offset to the measured signal strength for each cell. The UE may then connect to the most attractive cell (i.e. the cell with the greatest signal strength once the offset has been applied).

In the above embodiment, the macrocell eNodeB 3 allocates the PCI values to each femtocell in its coverage area. However, the skilled person will understand that it is not essential for the allocation to be performed by the macrocell eNodeB 3. That is, any form of base station for a mobile telecommunications network may implement the method. Furthermore, any device in the network which is configured to receive the strength of a signal from the second cell's base station at each femtocell in the second cell's coverage area (either directly or indirectly) may then define a plurality of bands and allocate the PCIs to each cell using the above algorithm. For example, a dedicated device in the network or any one of the femtocells may be configured to receive the signal strength data and perform the above algorithm. The output of the algorithm would inform the femtocells of their PCIs and also build the neighbour list for the macrocell. Furthermore, the skilled person will understand that the method may be computer implemented.

The algorithm above is optimized such that each femtocell is allocated a PCI that will either have a large Hamming distance with all nearby femtocells (i.e. a femtocell that may have an overlapping coverage area with that femtocell), or a duplicate PCI with a femtocell chosen for low interference (e.g. a femtocell that is geographically remote). However, the skilled person will understand that some of the steps of the allocation algorithm above are not essential. For example, the allocation algorithm may allocate any number of possible PCI values to the femtocells in any one group. However, this may increase the chances of interference as the Hamming distance between two PCI allocations within the group decreases.

The skilled person will understand that the present invention provides further advantages. For example, conventional UEs must make frequent signal strength measurements for femtocell and macrocell base stations when determining whether a cell handover is appropriate. However, in the present invention, a UE may make a measurement report for neighbouring cells and report this to a serving femtocell. The serving femtocell may then use this report to predict the macro location, thus reducing the need for the UE to make reports for the macrocell. This may therefore increase the battery life for the UE.

Figure 6:
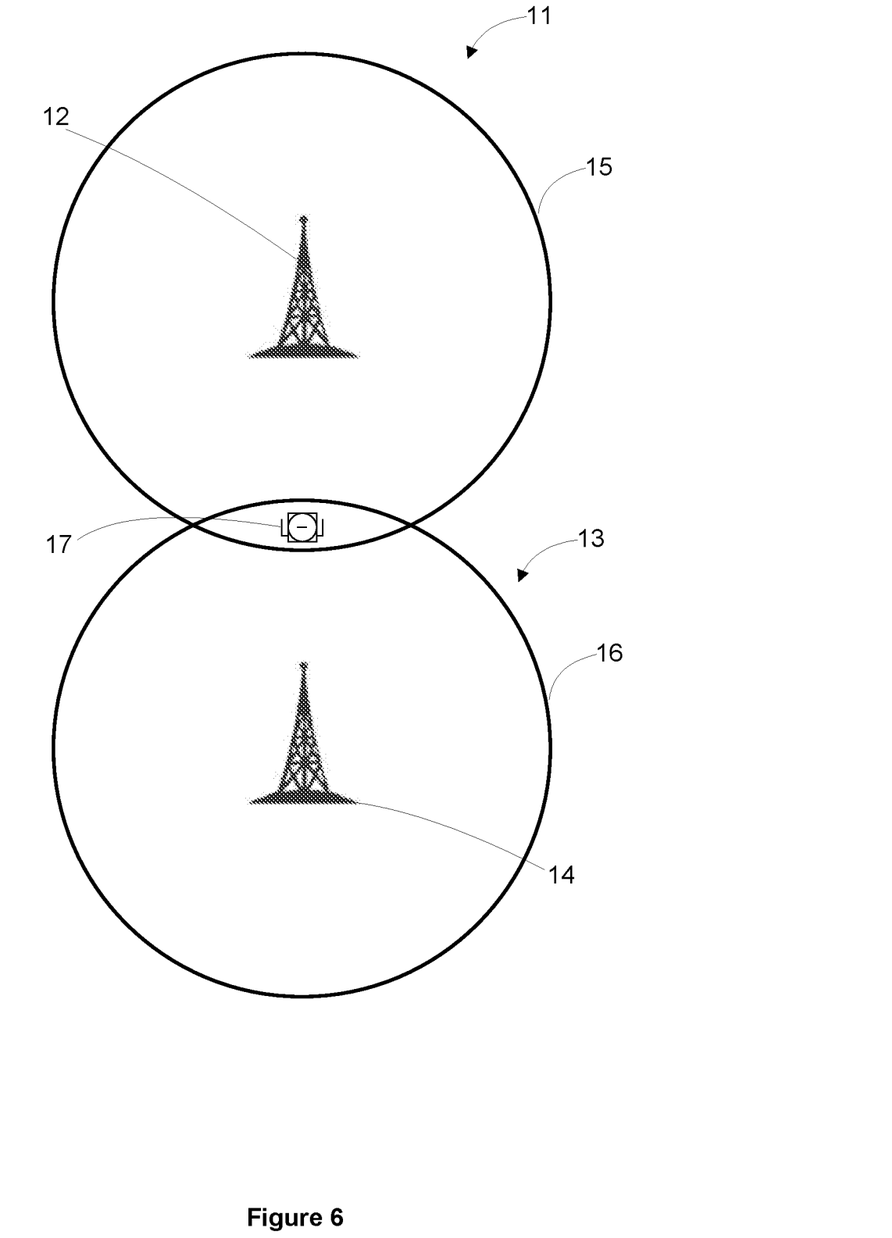
FIG. 6 is a schematic diagram illustrating a second embodiment of the present invention, including two macrocell and small cell systems, wherein the two macrocells' coverage areas overlap.

FIG. 6 illustrates a second embodiment of the present invention, including a first and second macrocell, 11, 13, having a first and second eNodeB base station 12, 14 and first and second coverage area 15, 16 respectively. The first and second coverage areas 15, 16 overlap such that there is an overlapping coverage portion 15. In this example, a femtocell 17 is within the overlapping coverage portion 15, such that it may receive signals from both the first and second eNodeB base stations 12, 14.

The femtocell 17 may measure the signal strength from both the first and second eNodeB base stations 12, 14. In this example, the femtocell 17 measures a greater signal strength from the first eNodeB base station 12, and reports its signal strength to the first eNodeB base station 12 for PCI allocation. The first eNodeB base station 12 therefore allocates the PCI (as described above) and sends a signal to the femtocell 17 such that it may configure its PCI accordingly. The neighbour lists from the first eNodeB base station 12 and the femtocell 17 may therefore include this PCI and corresponding Q offset.

The skilled person will understand that, as the femtocell 17 is also within the second coverage area of the second eNodeB base station 14, there may be a PCI conflict with another femtocell in the second coverage area 16. To mitigate the chance of such a conflict occurring, the PCI allocated to femtocell 17 may be taken into account when allocating PCIs to other femtocells in area 16. The neighbour lists of eNodeB 12 and eNodeB 14 can both contain the PCI of femtocell 17, but with possibly different offset values.

The above embodiments describe a plurality of femtocells within the coverage area of a macrocell's eNodeB base station. However, the skilled person will understand that the above method applies to any cell residing in the coverage area of a larger cell (i.e. any cell having a coverage area which is smaller than the coverage area of the larger cell). For example, the method may equally apply to a plurality of femtocells in a coverage area of a picocell, a plurality of picocells in a coverage area of a microcell, or a plurality of microcells in a coverage area of a macrocell.

In the embodiments above, the eNodeB may calculate the width of each signal strength range such that the coverage area is covered by a particular number of bands of equal thickness or such that each band has an equal number of femtocells. However, the skilled person will understand that the width of the signal strength ranges may also be calculated such that there are the fewest conflicts per band.

The skilled person will understand that any combination of features is possible within the scope of the invention as claimed.

The invention claimed is:

1. A method of allocating a Physical Cell ID, PCI, to a small cell, wherein the small cell is one of a plurality of small cells disposed within a coverage area of a macrocell's base station, the method comprising the steps of:

receiving signal strength data for a plurality of small cells, wherein the signal strength data relates to the strength of a signal from the macrocell's base station at each cell of the plurality of small cells;

defining a plurality of bands in a coverage area of the macrocell's base station based on the received signal strength data, wherein each band has a predetermined signal strength range;

selecting a group for each small cell based on the strength of the signal from the macrocell's base station at that small cell and the signal strength range for each band; and allocating a PCI to each small cell of the plurality of small cells based on the selected group, such that there is no duplication of PCIs across different groups.

2. A method as claimed in claim 1, further comprising the step of:

sending a signal to the small cell, the signal including the allocated PCI.

3. A method as claimed in claim 1, further comprising the step of:

allocating a PCI from a set of PCIs to each cell of the plurality of small cells based on the strength of the signal from the macrocell's base station at each small cell and its corresponding band of the plurality of bands, wherein each band includes a corresponding set of PCIs.

4. A method as claimed in claim 3, further comprising the step of:

compiling a neighbour list including the allocated PCIs for each small cell and a corresponding Q offset value.

5. A method as claimed in claim 4, further comprising the step of:

broadcasting the neighbour list.

6. A non-transitory storage medium storing a computer program containing computer-executable code which, when executed on a computer, causes the computer to perform the steps of the method of claim 1.

7. A device for allocating a Physical Cell ID, PCI, to a small cell, wherein the small cell is one of a plurality of small cells disposed within a coverage area of a macrocell's base station, the device comprising
- a receiver for receiving signal strength data for a plurality of small cells, wherein the signal strength data relates to the strength of a signal from the macrocell's base station at each small cell of the plurality of small cells; and
- a processor adapted to define a plurality of bands in a coverage area of the macrocell's base station based on the received signal strength data, wherein each band has a predetermined signal strength range,
- select a group for each small cell based on the strength of the signal from the macro cell's base station at that cell and the signal strength range for each band; and
- allocate a PCI to a small cell of the plurality of small cells based on the strength of its selected group, such that there is no duplication of PCIs across different groups.

8. A device as claimed in claim 7, further comprising a transmitter adapted to send a signal indicating the allocated PCI to the small cell.

9. A device as claimed in either claim 7, wherein the processor is adapted to allocate a PCI from a set of PCIs to each small cell of the plurality of small cells based on the strength of the signal from the macrocell's base station at each small cell and its corresponding band of the plurality of bands, wherein each band includes a corresponding set of PCIs.

10. A device as claimed in claim 7, wherein the processor is further adapted to compile a neighbour list including the allocated PCIs for each small cell and a corresponding Q offset value.

11. A device as claimed in claim 10, further comprising a transmitter adapted to broadcast the neighbour list.

12. A device as claimed in claim 7, being an eNodeB base station.

13. A method as claimed in claim 1, wherein:
the received signal strength is signal strength measured at and received from the plurality of cells.

14. A device as claimed in claim 7, wherein:
the received signal strength is signal strength measured at and received from the plurality of cells.

* * * * *